US012699516B2

(12) United States Patent
Wu et al.

(10) Patent No.: US 12,699,516 B2
(45) Date of Patent: Aug. 4, 2026

(54) PROTECTING DATA STORED IN MEMORY

(71) Applicant: SK Hynix NAND Product Solutions Corp., Rancho Cordova, CA (US)

(72) Inventors: Ning Wu, Folsom, CA (US); Mohammad Nasim Imtiaz Khan, Rancho Cordova, CA (US); Cory Lappi, Rochester, MN (US); Jozsef Dudas, Vancouver (CA)

(73) Assignee: Solidigm Inc., Rancho Cordova, CA (US)

( * ) Notice: Subject to any disclaimer, the term of this patent is extended or adjusted under 35 U.S.C. 154(b) by 42 days.

(21) Appl. No.: 18/986,414

(22) Filed: Dec. 18, 2024

(65) Prior Publication Data

US 2026/0169636 A1      Jun. 18, 2026

(51) Int. Cl.
*G06F 3/06* (2006.01)
(52) U.S. Cl.
CPC .......... *G06F 3/0619* (2013.01); *G06F 3/0659* (2013.01); *G06F 3/0679* (2013.01)
(58) Field of Classification Search
CPC ........................................................ G06F 3/06
See application file for complete search history.

(56) References Cited

U.S. PATENT DOCUMENTS

| | | | |
|---|---|---|---|
| 10,481,830 B2 * | 11/2019 | Higgins ................. | G11C 16/26 |
| 2010/0106917 A1 * | 4/2010 | Ruberg .............. | G06F 13/1663 |
| | | | 711/149 |
| 2012/0047319 A1 | 2/2012 | Yoon et al. | |
| 2015/0032967 A1 | 1/2015 | Udayashankar et al. | |
| 2018/0024777 A1 | 1/2018 | Higgins et al. | |
| 2020/0303019 A1 * | 9/2020 | Palmer ................... | G11C 16/26 |
| 2021/0397496 A1 | 12/2021 | Elyasi et al. | |
| 2023/0393756 A1 | 12/2023 | Muchherla et al. | |

* cited by examiner

*Primary Examiner* — Khoa D Doan
(74) *Attorney, Agent, or Firm* — HG LAW LLP

(57) ABSTRACT

Methods and related systems are provided. A method is performed by a memory device including memory, where the memory device is coupled to a host device. A method includes receiving, at the memory device, a command from the host device to read a portion of the memory, determining, by the memory device, for the portion of the memory, a threshold number of reads and a delay associated with the threshold number of reads, and providing, by the memory device, based on the command, the host device with data stored in the portion of memory using a plurality of throttled read operations. Each throttled read operation of the plurality of throttled read operations includes no more than the threshold number of reads and is performed based on the delay.

18 Claims, 3 Drawing Sheets

100

400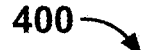

402

Receive, at processing circuitry of a memory device, a command from a host to read a portion of memory of the memory device

404

Determine, at the processing circuitry, for the portion of memory, a threshold number of reads and a latency associated with the threshold number of reads

406

Providing, based on the command, the host with information stored in the portion of memory using a plurality of throttled read operations, wherein each throttled read operation: comprises the threshold number of reads, and is temporally separated from each other read operation by the latency

FIG. 4

PROTECTING DATA STORED IN MEMORY

TECHNICAL FIELD

The present disclosure is directed to methods and systems for protecting data stored in memory.

BACKGROUND

Data stored in memory may be corrupted. In particular, the process of re-reading data stored in memory may corrupt the data.

SUMMARY

During the operation of memory devices, including those with a solid-state drive (SSD), there are times when data stored in a portion of memory is copied over to another portion of memory. Copying over the data requires reading the data, which can corrupt (e.g., through a read disturb mechanism) the data that is being read, and/or it can corrupt neighboring data. To prevent this corruption, processing circuitry of a memory device is provided for determining how relatively vulnerable a portion (e.g., a zoned namespace, in whole or in part) of memory is to corruption and for throttling host read commands based on the determination. The processing circuitry determines, based on the relative vulnerability, a threshold number of reads that can occur within a throttled read operation and a delay associated with successive throttled read operations. The processing circuitry provides data to the host based on the read commands using the throttled read commands. By throttling the read commands, the processing circuitry protects data stored in the memory device from being corrupted.

In accordance with some embodiments of the present disclosure, systems and methods are performed by a memory device including memory, where the memory device is coupled to a host device. A method includes receiving, at the memory device, a command from the host device to read a portion of the memory, determining, by the memory device, for the portion of the memory, a threshold number of reads and a delay associated with the threshold number of reads, and providing, by the memory device, based on the command, the host device with data stored in the portion of the memory using a plurality of throttled read operations. Each throttled read operation of the plurality of throttled read operations includes no more than the threshold number of reads and is performed based on the delay.

In some embodiments, using the plurality of throttled read operations includes reading a first portion of the data using the threshold number of reads, after reading the first portion of the data, waiting for an amount of time greater than or equal to the delay, and after waiting for the amount of time greater than or equal to the delay, reading a second portion of the data using the threshold number of reads.

In some embodiments, the method also includes tracking, for each throttled read operation, a last logical block address (LBA) for which data was provided, and causing each subsequent throttled read operation to initially provide the host with data stored in an LBA that is subsequent to the last LBA.

In some embodiments, the portion of the memory includes a zoned namespace, and the method further includes determining relatively vulnerable logical block addresses (LBAs) and relatively invulnerable LBAs of the zoned namespace, and after providing the data of the relatively vulnerable LBAs, providing data of the relatively invulnerable LBAs using a plurality of unthrottled read operations, wherein the plurality of throttled read operations provide the data from only the relatively vulnerable LBAs.

In some embodiments, the method also includes determining a relative vulnerability of the portion of the memory, where determining the relative vulnerability is based on at least one of a voltage threshold or an error check, and determining the threshold number of reads and the delay is based on the relative vulnerability of the portion of the memory.

In some embodiments, the method also includes tracking how many throttled read operations of the plurality of throttled read operations are performed.

In some embodiments, at least one of the threshold number of reads or the delay associated with the threshold number of reads is based on a relative vulnerability of the portion of the memory to corruption.

In some embodiments, the threshold number of reads includes a plurality of thresholds and the delay includes a plurality of delays, wherein each respective threshold and each respective delay is associated with a particular subportion of the portion of the memory based on a relative vulnerability of the particular subportion.

In some embodiments, the method also includes, after completing each throttled read operation of the plurality of throttled read operations, providing a corresponding message to the host, where the message includes a command interrupted status code, and a time associated with a subsequent throttled read operation, wherein the time corresponds to the delay.

In some embodiments, the method also includes, after providing the host with the data stored in the portion of the memory, writing the data to another portion of the memory.

BRIEF DESCRIPTION OF THE DRAWINGS

The following description includes discussion of figures having illustrations given by way of example of implementations of embodiments of the disclosure. The drawings should be understood by way of example, and not by way of limitation. As used herein, references to one or more "embodiments" are to be understood as describing a particular feature, structure, and/or characteristic included in at least one implementation. Thus, phrases such as "in one embodiment" or "in an alternate embodiment" appearing herein describe various embodiments and implementations, and do not necessarily all refer to the same embodiment. However, they are also not necessarily mutually exclusive.

FIG. 4 shows a flowchart of illustrative steps for protecting data stored in memory, in accordance with some embodiments of the present disclosure.

DETAILED DESCRIPTION

Figure 1:
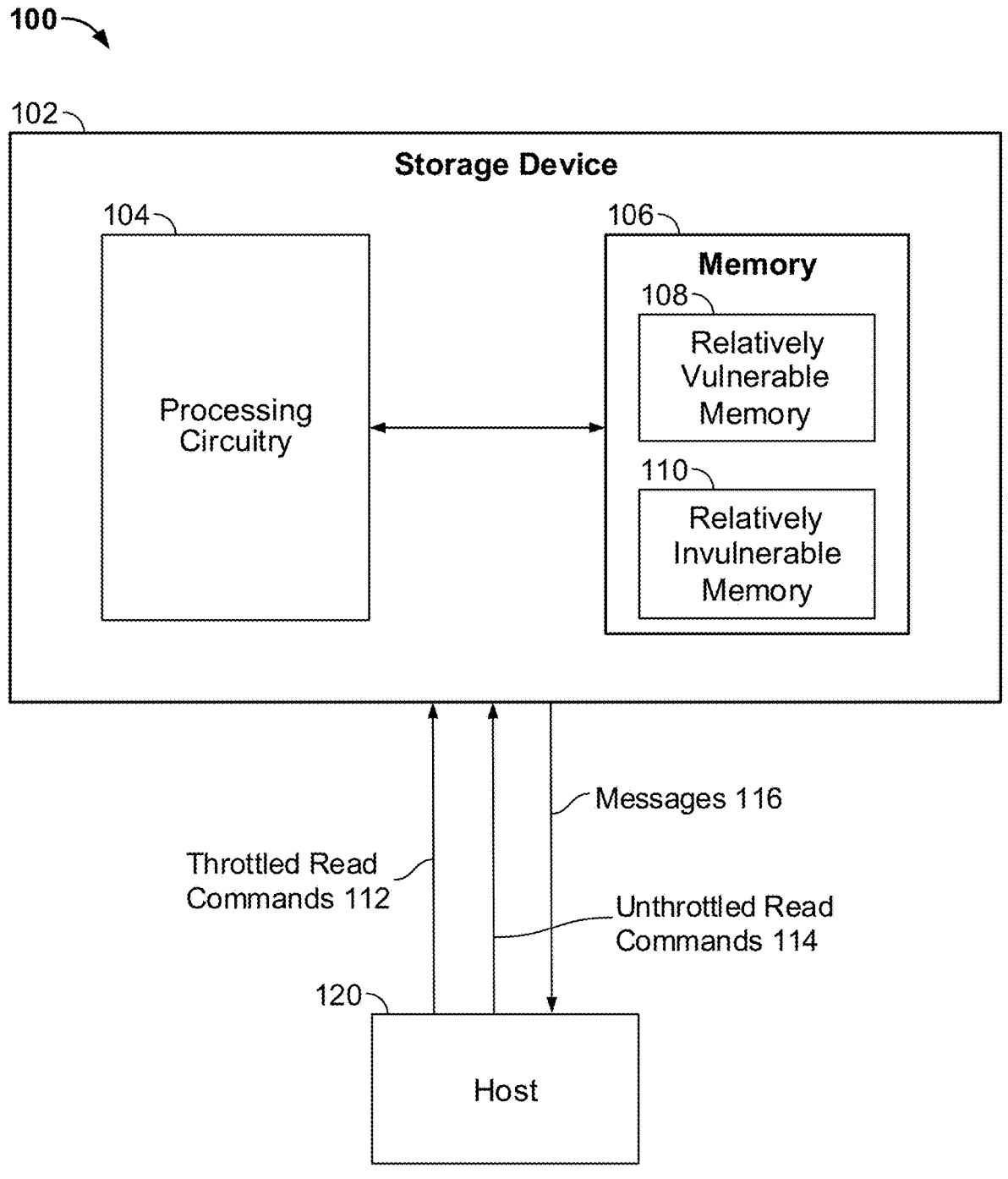
FIG. 1 shows a storage device configured to throttle read commands from a host, in accordance with some embodiments of the present disclosure.

During the operation of memory devices, including those with a solid-state drive (SSD), there are times when data stored in a portion of memory (e.g., a first zoned namespace (ZNS), or a first portion or zone of the first ZNS) is copied over (i.e., relocated) to another portion of memory (e.g., a second ZNS, or a second portion or zone of the first ZNS). For example, data may be copied over after having been stored for a threshold amount of time, to accommodate the writing of new memory, to normalize how long respective groups of memory have been stored across the memory device, to normalize how many times various portions of the memory have been written to, read from, and/or erased, or for any other suitable reason.

Copying over the data requires reading and possibly re-reading the data, which can corrupt the data that is being read, and/or it can corrupt neighboring data. In some embodiments, it may be determined that data is relatively vulnerable to being corrupted through a read disturb mechanism (e.g., as indicated by a NAND policy); in other embodiments, it may be determined that data is relatively vulnerable to being corrupted based on any other suitable NAND policy. Based on the relative vulnerability of the data and to avoid corrupting the data, processing circuitry of the memory device may intervene to throttle, pause, or abort read operations by a host (e.g., an SSD host controller).

In some embodiments, memory page-based eviction policies may be implemented to block read operations based on read disturb NAND policies. However, such memory page-based policies may not be applicable to systems that use other mechanism (e.g., including those relying on ZNSs) to apportion and manage memory. In other embodiments, a memory drive may protect data stored in memory by denying all read operations and implementing an internal (e.g., not involving a host) approach to copying over data. However, such an approach may incur excessive read latency (e.g., following a host read command), may require excessive read/write/erase operations, and/or may prevent a host from performing the memory relocation.

To protect data stored in ZNS memory without denying all read operations, processing circuitry of a memory device is provided. The processing circuitry determines that a portion (e.g., a zone a ZNS) of memory is relatively vulnerable (e.g., to corruption, as compared to other portions, and/or in view of a read command requested by a host) to corruption. In response, the processing circuitry throttles the host read commands (e.g., by permitting the read to occur through multiple throttled read commands). The processing circuitry throttles the read commands according to the determined degree of vulnerability. In particular, the processing circuitry determines a threshold number of reads that can occur within a throttled read operation and a delay or latency associated with successive throttled read operations.

The processing circuitry restricts the host to only performing the threshold number of reads in any one throttled read command. Moreover, the processing circuitry restricts the host to performing successive throttled read commands only after a prescribed delay has passed. In some embodiments, the threshold number of reads and the delay are maintained uniform across multiple throttled read commands. In some embodiments, the processing circuitry determines particular thresholds and particular delays for corresponding subportions of the memory. For example, these subportions may be respective groups of one or more logical block addresses (LBAs). In some embodiments, after the relatively vulnerable data has been read using throttled read operations, the processing circuitry permits the host to read relatively invulnerable data using unthrottled read operations.

In accordance with some embodiments of this disclosure, the host does not incur unexpected and/or relatively long delays during data relocation, and corruption due to read disturb or other mechanism can be avoided. For example, read disturb relocation processes may proceed according to implementations of this disclosure without corrupting any data. Moreover, the host may be afforded a predictable latency during management operations, which can improve the capability of the host to balance other workloads.

The subject matter of this disclosure is further discussed with reference to FIGS. 1-4.

FIG. 1 shows a storage device that is communicatively coupled to a host configured to cause the device to update, in accordance with some embodiments of the present disclosure. The storage device 102 includes processing circuitry 104 and memory 106. In some embodiments, the memory 106 includes multiple zones. Memory 106 typically includes relatively vulnerable memory 108 and relatively invulnerable memory 110. It will be understood that, as used herein, "relatively vulnerable" memory is memory that is more likely (e.g., according to a threshold voltage, read disturb policy, or any other NAND policy or memory policy) to be corrupted by a given read operation, while "relatively invulnerable" memory is memory that is less likely (e.g., according to a threshold voltage, read disturb policy, or any other NAND policy or memory policy) to be corrupted by a given read operation. In general, all memory 106 is vulnerable, and embodiments of this disclosure determine how relatively vulnerable a zone or portion of memory is to determine whether command throttling is needed (and to what extent). Processing circuitry 104 is coupled to memory 106 to, among other functions, determine (e.g., based on a memory policy, data stored in memory 106, and a read command) whether respective portions of memory 106 are relatively vulnerable or relatively invulnerable.

Processing circuitry 104 can at least write to, read from, and erase from, memory cells of memory 106. The host 120 can cause processing circuitry 104 to perform these actions on memory 106 based on any suitable command. These commands include, but are not limited to, throttled read commands 112 and unthrottled read commands 114. In connection with at least the throttled read commands 112 and the unthrottled read commands 114, storage device 102 is configured to send messages 116 (e.g., status messages, in connection with throttled read operations, as further described below) to host 120.

In some embodiments, storage device 102 is an SSD and the aforementioned commands cause memory to be read from (e.g., through throttled or unthrottled read operations), written to, or erased off of the SSD. The SSD is a data storage device that uses integrated circuit assemblies as memory to store data persistently. SSDs have no moving mechanical components, and this feature distinguishes SSDs from traditional electromechanical magnetic disks, such as, hard disk drives (HDDs) or floppy disks, which contain spinning disks and movable read/write heads. Compared to electromechanical disks, SSDs are typically more resistant to physical shock, run silently, have lower access time, and less latency.

Figure 2:
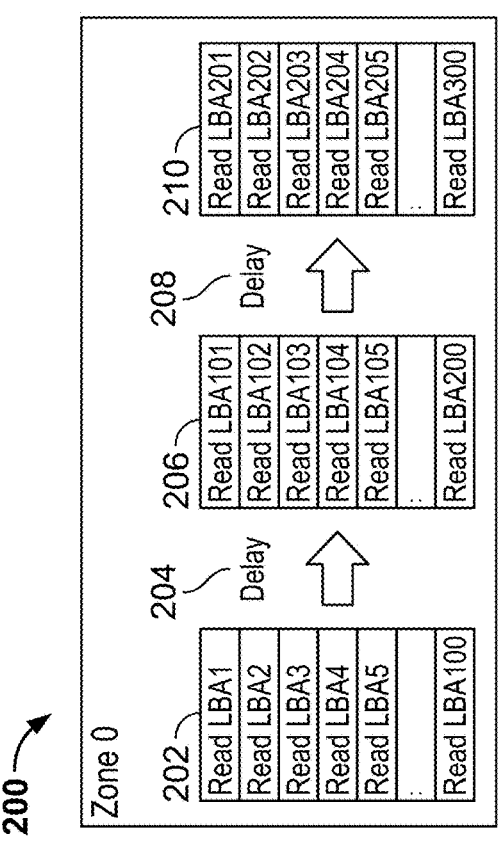
FIG. 2 shows a flow diagram of illustrative throttled read commands, in accordance with some embodiments of the present disclosure.

FIG. 2 shows a flow diagram 200 of illustrative throttled read commands, in accordance with some embodiments of the present disclosure. In some embodiments, flow diagram 200 occurs after a host (e.g., host 120) issues a read command to a memory device (e.g., storage device 102) to read memory of the memory device, and in particular after processing circuitry (e.g., processing circuitry 104) of the memory device determines that executing the read command using a typical processing flow would risk corrupting data stored in memory (e.g., memory 106) of the memory device.

As a result, the memory device causes the host to read the memory through throttled read commands (e.g., throttled read commands 112).

In the illustrative diagram of FIG. 2, LBAs are read from Zone 0 (e.g., a first zone), which includes at least LBA1 through LBA300. In some embodiments, Zone 0 is a component of memory 106, and LBA1 through LBA300 are determined by processing circuitry 104 to be relatively vulnerable memory 108. Therefore, host 120 reads data of Zone 0 through throttled read commands 202, 206, and 210.

Throttled read commands 202, 206, and 210 are implemented by processing circuitry to prevent corruption (e.g., through read disturb mechanisms) of the data stored in LBA1 through LBA300. As shown, each throttled read command provides access to the data of 100 LBAs, although this number of LBAs is merely illustrative. Indeed, processing circuitry may determine any suitable number of LBAs (e.g., 1, 10, 100, or 1,000 LBAs) to be read in a single throttled read command based on a relative vulnerability of data stored at the LBAs to being corrupted. Processing circuitry may make the same number of LBAs accessible in each throttled read command, as shown in FIG. 2, or processing circuitry may determine a respective number of LBAs to be made available in each throttled read command.

To further protect the relatively vulnerable data, throttled read commands 202 and 206 are separated by delay 204, and throttled read commands 206 and 210 are separated by delay 208. Each of delay 204 and delay 208 provides a latency or delay that is set according to the relative vulnerability of the data stored at the LBAs to being corrupted. For example, these delays may be 1 ms, 10 ms, 100 ms, 1 second, or any other suitable length of time. Processing circuitry may apply the same delay after each throttled read commands, or processing circuitry may determine a respective delay to be applied after each throttled read command.

In some embodiments, processing circuitry of the memory device implements throttled read commands by rejecting or interrupting read commands that are issued by the host beyond the threshold number of reads. For example, after the 100 read commands of throttled read commands 202, the processing circuitry can reject a $101^{st}$ read command by the host and can force the host to wait until after delay 204 has passed before permitting execution of that $101^{st}$ read command. In some embodiments, the processing circuitry may apply the NVMe Advanced Command Retry mechanism to reject read commands from the host, as needed.

In some embodiments, processing circuitry uses a firmware counter to count the number of read commands and to interrupt commands beyond the threshold number of reads. In some embodiments, processing circuitry uses a firmware timer (e.g., that may be specific to a zoned namespace from which the host is reading data) to track memory reads and to monitor whether a determined delay condition is being satisfied based on the implementation a corresponding delay. In some embodiments, the firmware dynamically allocates a counter and/or timer to support the aforementioned tasks, and the firmware may reallocate or release the counter and/or timer after the read disturb scenario on the zone is resolved.

Figure 3:
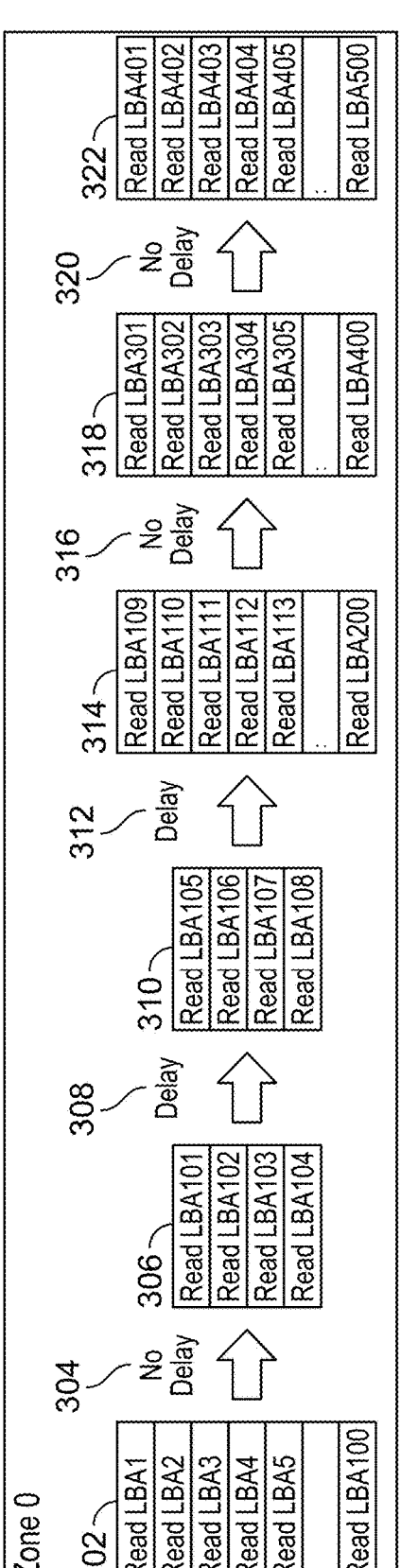
FIG. 3 shows a flow diagram of illustrative throttled and unthrottled read commands, in accordance with some embodiments of the present disclosure.

FIG. 3 shows a flow diagram 300 of illustrative throttled read commands and unthrottled read commands, in accordance with some embodiments of the present disclosure. In some embodiments, flow diagram 300 occurs in response to the same steps as flow diagram 200, except that processing circuitry of the memory device determines that only some of the memory to be read is relatively vulnerable to being corrupted. As a result, the processing circuitry causes the host to read the memory through throttled read commands (e.g., throttled read commands 112) and unthrottled read commands (e.g., unthrottled read commands 114). For example, the processing circuitry may determine that certain wordlines (or other portions of memory) are more relatively vulnerable (e.g., to read disturb or other corruption mechanisms) than other wordlines, and may therefore classify wordlines as relatively vulnerable memory 108 or as relatively invulnerable memory 110.

In the illustrative diagram of FIG. 3, LBAs are read from Zone 0 (e.g., a first zone), which includes at least LBA1 through LBA500. In some embodiments, Zone 0 is a component of memory 106, LBA1 through LBA100, as well as LBA109 through LBA200 and LBA301 through LBA500, are determined by processing circuitry 104 to be relatively invulnerable memory 110, and LBA101 through LBA108 are determined by processing circuitry 104 to be relatively vulnerable memory 108. Therefore, host 120 reads some data of Zone 0 through unthrottled read commands 302, 314, 318, and 322, and host 120 reads other data of Zone 0 throttled read commands 306 and 310.

In the illustrative process of FIG. 3, unthrottled and throttled read commands are executed as follows. Initially, LBA1 through LBA100 are read using unthrottled read command 302 (e.g., because processing circuitry determines that the data stored at these LBAs is relatively invulnerable to being corrupted). While the unthrottled read command 302 causes the host to read the same number of LBAs as throttled read commands 202, 206, and 210, that is merely coincidental. Following unthrottled read command 302, there is no added delay 304 before the subsequent read command. That is, the only delay occurring between read commands 302 and 306 is that which necessarily occurs between logical processor operations, and the processing circuitry does not cause there to be additional delays for the sake of protecting relatively vulnerable memory.

The next read command of FIG. 3 is throttled read command 306. In this illustrative example, processing circuitry has determined that LBA101 through LBA108 are relatively vulnerable memory 108 and therefore should be read using throttled read commands 112. As a result, throttled read command 306 causes the host to only read data of four LBAs (i.e., LBA101 through LBA105). Moreover, processing circuitry causes delay 308 to occur after throttled read command 306. Both the number of LBAs to read at throttled read command 306, and the latency associated with delay 308, are set by processing circuitry according to the determined degree of relative vulnerability of the LBAs. Similarly, throttled read command 310 causes the host to read data of four additional LBAs and is followed by delay 312.

The remainder of the LBAs that are read in the illustrative flow of FIG. 3 are determined be relatively invulnerable to corruption. As a result, LBA109 through LBA200, and LBA301 through LBA500, are read through unthrottled read commands 314, 318, and 322. There is no added delay 316 and no added delay 320 between execution of these respective unthrottled read commands.

FIG. 4 shows a flowchart of illustrative steps of a method 400 for protecting data stored in memory, in accordance with some embodiments of the present disclosure. In some embodiments, the method 400 is performed by a storage device (e.g., storage device 102, particularly processing circuitry 104) in response to commands from a host device (e.g., host 120). Method 400 includes causing the host to read data from the storage device (e.g., data stored in memory 106, particularly the relatively invulnerable memory 108) using throttled read commands 112.

At step 402, method 400 includes receiving, at a memory device, a command from a host device to read a portion of memory (e.g., a zoned namespace) of the memory device. In some embodiments, the command is issued so that a host device may copy over or relocate data stored at the portion of memory to another portion of memory.

In some embodiments, in response to receiving the command, processing circuitry of the memory device determines that data stored at the portion of memory is relatively vulnerable (e.g., through a read disturb or other corruption mechanism) to being corrupted. In some embodiments, in response to receiving the command, processing circuitry of the memory device determines that to execute the read commands using a typical (i.e., unthrottled, or otherwise unmodified) workflow would violate a memory device policy, such as a NAND policy.

At step 404, method 400 includes determining, by the memory device, for the portion of memory, a threshold number of reads and a delay associated with the threshold number of reads. For example, the threshold number of reads may correspond to 100 LBAs, as shown in FIG. 2, it may correspond to 4 LBAs, as shown in FIG. 3, or it may correspond to any other suitable number of LBAs (e.g., that is determined based on the relative vulnerability of the LBAs to corruption, or based on a memory device policy). For example, the length of the delay (e.g., of delays 204 and 208, or delays 308 and 312) may be 1 ms, 1 s, or any other suitable amount of time (e.g., that is determined based on the relative vulnerability of the LBAs to corruption, or based on a memory device policy). In some embodiments, step 404 includes determining multiple thresholds and/or multiple delays, with each respective threshold and/or each respective delay being associated with a particular subportion of the portion of memory and being based on a relative vulnerability of the particular subportion.

At step 406, method 400 includes providing, based on the command, the host device with data stored in the portion of memory using a plurality of throttled read operations (e.g., throttled read operations 112). Each throttled read option of the plurality of throttled read operations includes no more than the threshold number of reads and is based on (e.g., temporally separated from each other throttled read operation) the delay. Based on step 406, data stored in relatively vulnerable memory may be made available to the host, without corrupting that data or other data stored in the memory. In some embodiments, step 406 also includes tracking how many throttled read operations are performed.

For example, step 406 may include reading a first portion of data (e.g., particular LBAs of a zoned namespace) using a first threshold number of reads. Step 406 may also include, after reading the first portion of data, waiting for an amount of time greater than or equal to the delay. Step 406 may also include, after waiting for the amount of time greater than or equal to the delay, reading a second portion of the data (which may or may not include the same number of LBAs as the first portion of data) using a second threshold number of reads (which may or may not be equal to the first threshold number of reads). Should there be additional portions of data to read using additional throttled read commands, step 406 may include reading each of the additional portions using respective throttled read commands, and waiting for respective delays (which may be uniform, or which may be specific to the respective portions of data) that temporally separate every throttled read operation from a prior throttled read operation.

In some embodiments, method 400 also includes tracking, for each throttled read operation, a last logical block address (LBA) for which data was provided, and causing each subsequent throttled read operation to initially provide the host with data stored in an LBA that is subsequent to the last LBA. For example, as shown in FIG. 3, processing circuitry may track that throttled read operation 306 terminated at LBA104, and thus may cause the subsequent throttled read operation 310 to begin at LBA105.

In some embodiments, method 400 also includes, at step 404, determining that the portion of memory (e.g., the zoned namespace) includes relatively vulnerable LBAs (e.g., relatively vulnerable memory 108) and relatively invulnerable LBAs (e.g., relatively invulnerable memory 110). Further, at step 406, providing data of the zoned namespace using the throttled read operations may include providing data of only the relatively vulnerable LBAs. As shown, for example in FIG. 3, method 400 may further include providing data of the relatively invulnerable LBAs using unthrottled read operations 114.

In some embodiments, method 400 also includes, at or before step 404, determining a relative vulnerability of the portion of the memory. Any one or more of the following approaches may be used to determine the relative vulnerability (or invulnerability) of the memory to corruption. In one approach, processing circuitry may determine whether various LBAs (or various memory blocks or memory cells within a given LBA) are relatively vulnerable based on comparing a voltage associated with the LBA, block, or memory cell to a voltage threshold (e.g., where an LBA, block, or memory cell may be deemed relatively vulnerable if its voltage is below, or sufficiently close to, the voltage threshold). In another approach, processing circuitry may determine relative vulnerability based on an error check (e.g., a number of error-correction code (ECC) cycles, a number of moving read reference (MRR) correction cycles, or the outcome of a low-density parity check (LDPC) operation); for example, memory may be determined to be relatively vulnerable if a threshold number of ECC and/or MRR cycles have occurred, or if a threshold syndrome weight is determined by an LDPC.

In some embodiments, method 400 also includes, at step 406, providing a message to the host after completing each throttled read operation. For example, the message may include a command interrupted notification or command interrupted status code (i.e., informing the host that a read command was interrupted due to being throttled). For another example, the message may otherwise or additionally include a command retry delay value (e.g., a time associated with a subsequent throttled read operation, where the time corresponds to the delay determined at step 404). For example, the command retry delay value may indicate a delay time associated with any of the delays shown in FIGS. 2-3, or with any other suitable delay applied as part of a throttled read operation.

In some embodiments, such as when the host issues the read commands to relocate or copy over data from a first portion of memory to a second portion of memory, method 400 also includes, after providing the host with the data stored in the (e.g., first) portion of memory, writing the data to another (e.g., second) portion of memory.

In some embodiments, the host may try to read the same LBA in consecutive read commands, and the processing circuitry may determine to throttle the second of such read commands to prevent re-reading of the same LBA until a suitable delay has passed.

Thus it has been shown that systems and methods are provided for protecting data stored in memory. For example, the systems and methods may provide for sensing or determining the relative vulnerability of the memory, and for protecting the data based on the determined relative vulnerability. While the systems and methods of the present disclosure are provided, in some embodiments, for protecting data when copying it from one location to another, it will be understood that this disclosure may apply at least to any approach for throttling read commands (including, but not limited to, any type of re-read commands) that are issued to a memory device.

The terms "an embodiment", "embodiment", "embodiments", "the embodiment", "the embodiments", "one or more embodiments", "some embodiments", and "one embodiment" mean "one or more (but not all) embodiments" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments. Further, although process steps, method steps, algorithms or the like may be described in a sequential order, such processes, methods, and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments need not include the device itself.

At least certain operations that may have been illustrated in the figures show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to be limited to the precise forms disclosed. Many modifications and variations are possible in light of the above teaching.

What is claimed is:

1. A method performed by a memory device comprising memory, the memory device coupled to a host device, the method comprising:

receiving, at the memory device, a command from the host device to read a portion of the memory;

determining, by the memory device, for the portion of the memory, a threshold number of reads and a delay associated with the threshold number of reads; and providing, by the memory device, based on the command, the host device with data stored in the portion of the memory using a plurality of throttled read operations, wherein each throttled read operation of the plurality of throttled read operations:

comprises no more than the threshold number of reads, and is performed based on the delay;

wherein providing the data using the plurality of throttled read operations comprises: reading a first portion of the data using the threshold number of reads;

after reading the first portion of the data, waiting for an amount of time greater than or equal to the delay; and after waiting for the amount of time greater than or equal to the delay, reading a second portion of the data using the threshold number of reads.

2. The method of claim 1, wherein the portion of the memory comprises a zoned namespace, the method further comprising:

determining relatively vulnerable logical block addresses (LBAs) and relatively invulnerable LBAs of the zoned namespace; and after providing the data of the relatively vulnerable LBAs, providing data of the relatively invulnerable LBAs using a plurality of unthrottled read operations, wherein:

the plurality of throttled read operations provide the data from only the relatively vulnerable LBAs.

3. The method of claim 1, further comprising determining a relative vulnerability of the portion of the memory, wherein:

determining the relative vulnerability is based on at least one of a voltage threshold or an error check; and determining the threshold number of reads and the delay is based on the relative vulnerability of the portion of the memory.

4. The method of claim 1, further comprising tracking how many throttled read operations of the plurality of throttled read operations are performed.

5. The method of claim 1, wherein at least one of the threshold number of reads or the delay associated with the threshold number of reads is based on a relative vulnerability of the portion of the memory to corruption.

6. The method of claim 1, wherein the threshold number of reads comprises a plurality of thresholds and the delay comprises a plurality of delays, wherein each respective threshold and each respective delay is associated with a particular subportion of the portion of the memory based on a relative vulnerability of the particular subportion.

7. The method of claim 1, further comprising, after providing the host device with the data stored in the portion of the memory, writing the data to another portion of the memory.

8. A method performed by a memory device comprising memory, the memory device coupled to a host device, the method comprising:

receiving, at the memory device, a command from the host device to read a portion of the memory;

determining, by the memory device, for the portion of the memory, a threshold number of reads and a delay associated with the threshold number of reads;

providing, by the memory device, based on the command, the host device with data stored in the portion of the memory using a plurality of throttled read operations, wherein each throttled read operation of the plurality of throttled read operations:

comprises no more than the threshold number of reads, and is performed based on the delay:

tracking, for each throttled read operation, a last logical block address (LBA) for which data was provided; and causing each subsequent throttled read operation to initially provide the host device with data stored in an LBA that is subsequent to the last LBA.

9. A method performed by a memory device comprising memory, the memory device coupled to a host device, the method comprising:

receiving, at the memory device, a command from the host device to read a portion of the memory;

determining, by the memory device, for the portion of the memory, a threshold number of reads and a delay associated with the threshold number of reads;

providing, by the memory device, based on the command, the host device with data stored in the portion of the memory using a plurality of throttled read operations, wherein each throttled read operation of the plurality of throttled read operations:

comprises no more than the threshold number of reads, and is performed based on the delay; and after completing each throttled read operation, providing a message to the host device, wherein the message comprises:

a command interrupted status code, and a time associated with a subsequent throttled read operation, wherein the time corresponds to the delay.

10. A system comprising a host device communicatively coupled to a memory device, the memory device comprising memory and processing circuitry to:

receive, at the memory device, a command from the host device to read a portion of the memory;

determine, by the memory device, for the portion of the memory, a threshold number of reads and a delay associated with the threshold number of reads; and provide, by the memory device, based on the command, the host device with data stored in the portion of the memory using a plurality of throttled read operations, wherein each throttled read operation of the plurality of throttled read operations:

comprises no more than the threshold number of reads, and is performed based on the delay;

wherein the processing circuitry is to provide the data using the plurality of throttled read operations by:

reading a first portion of the data using the threshold number of reads;

after reading the first portion of the data, waiting for an amount of time greater than or equal to the delay; and after waiting for the amount of time greater than or equal to the delay, reading a second portion of the data using the threshold number of reads.

11. The system of claim 10, wherein the portion of the memory comprises a zoned namespace, and wherein the processing circuitry is further to:

determine, based on a voltage threshold, relatively vulnerable logical block addresses (LBAs) and relatively invulnerable LBAs of the zoned namespace; and after providing the data of the relatively vulnerable LBAs, providing data of the relatively invulnerable LBAs using a plurality of unthrottled read operations, wherein:

the plurality of throttled read operations provide the data from only the relatively vulnerable LBAs.

12. The system of claim 10, wherein the processing circuitry is further to determine a relative vulnerability of the portion of the memory, wherein:

to determine the relative vulnerability is based on at least one of a voltage threshold or an error check; and to determine the threshold number of reads and the delay is based on the relative vulnerability of the portion of the memory.

13. The system of claim 10, wherein the processing circuitry is further to track how many throttled read operations of the plurality of throttled read operations are performed.

14. The system of claim 10, wherein at least one of the threshold number of reads or the delay associated with the threshold number of reads is based on a relative vulnerability of the portion of the memory to corruption.

15. The system of claim 10, wherein the threshold number of reads comprises a plurality of thresholds and the delay comprises a plurality of delays, wherein each respective threshold and each respective delay is associated with a particular subportion of the portion of the memory based on a relative vulnerability of the particular subportion.

16. The system of claim 10, wherein the processing circuitry is further to, after providing the host device with the data stored in the portion of the memory, write the data to another portion of the memory.

17. A system comprising a host device communicatively coupled to a memory device, the memory device comprising memory and processing circuitry to:

receive, at the memory device, a command from the host device to read a portion of the memory;

determine, by the memory device, for the portion of the memory, a threshold number of reads and a delay associated with the threshold number of reads;

provide, by the memory device, based on the command, the host device with data stored in the portion of the memory using a plurality of throttled read operations, wherein each throttled read operation of the plurality of throttled read operations:

comprises no more than the threshold number of reads, and is performed based on the delay:

track, for each throttled read operation, a last logical block address (LBA) for which data was provided; and cause each subsequent throttled read operation to initially provide the host device with data stored in an LBA that is subsequent to the last LBA.

18. A system comprising a host device communicatively coupled to a memory device, the memory device comprising memory and processing circuitry to:

receive, at the memory device, a command from the host device to read a portion of the memory;

determine, by the memory device, for the portion of the memory, a threshold number of reads and a delay associated with the threshold number of reads;

provide, by the memory device, based on the command, the host device with data stored in the portion of the memory using a plurality of throttled read operations, wherein each throttled read operation of the plurality of throttled read operations:

comprises no more than the threshold number of reads, and is performed based on the delay; and after completing each throttled read operation, provide a message to the host device, wherein the message comprises:

a command interrupted status code, and a time associated with a subsequent throttled read operation, wherein the time corresponds to the delay.

\* \* \* \* \*